UNITED STATES PATENT OFFICE.

CARL A. W. VOLLRATH, OF SHEBOYGAN, WISCONSIN, ASSIGNOR TO THE JACOB J. VOLLRATH MANUFACTURING COMPANY, OF SHEBOYGAN, WISCONSIN, A CORPORATION OF WISCONSIN.

COMPOSITION FOR PRODUCING SPECKLED ENAMEL.

1,119,905.     Specification of Letters Patent.     Patented Dec. 8, 1914.

No Drawing.     Application filed September 26, 1907. Serial No. 394,526.

*To all whom it may concern:*

Be it known that I, CARL A. W. VOLLRATH, residing in Sheboygan, in the county of Sheboygan and State of Wisconsin, have invented new and useful Improvements in Compositions for Producing Speckled Enamel, of which the following is a specification.

This invention relates to improvements in forming a composition for and process of coating metallic surfaces to produce a variegated, speckled or mottled appearance to said surfaces.

It is one of the objects of this invention to provide an improved composition for and process of coating metallic surfaces in which a colored silicate or glass of such high fusibility, temper and brittleness as to be wanting in itself those properties essential to the successful covering of metallic or porcelain surfaces is used in connection with an ordinary enamel to produce a mottled or speckled appearance.

A further object of the invention is to provide an improved composition for and process of coating metallic surfaces to give a mottled or speckled appearance in which the specks remain inert during the fusibility of the ordinary enamel whereby the specks are sharply defined and do not blend with the body of the enamel.

In carrying out the process, the metallic surface to be coated is first suitably prepared in any of the well known ways so as to render said surfaces capable of receiving the coating thereon, as well as to protect the surface from the effect of heat. This preparatory treatment usually consists in cleaning the metal surface in any well known manner, and then if desired applying thereto a ground or foundation coating, which may consist of silicate, or sand, borax and clay, the said silicate, or sand, borax and clay serving to protect the surface from the effects of heat, and thereby preventing oxidation.

The particular composition and mixture comprehended by my invention, and which is to be applied to the article which is initially prepared as heretofore stated, consists of metallic oxid and a suitable substance which will serve to reduce the strength of the color and also serve as a holding medium. This substance consists of a material which will not fuse under the temperature ordinarily used in fusing vitreous enamel.

While I do not wish to be understood as specifically limiting myself thereto, yet I have found by experience that ordinary window glass broken into fragments, and mixed with metallic oxid, the latter to impart the coloring effect, have produced the most desirable results. The glass readily mixing with the oxid to form a solid color or tint. The next step after mixing these two ingredients together, is to fuse the mixture until it assumes a plastic condition. The succeeding step is to cool the mass and then reduce it or grind or pulverize it to the fineness desired. After the cooling and reducing operation the fine particles of the mixture are in turn, and in a dry condition, mixed with a dry powdered one-color porcelain enamel (white or any other color), the enamel when so mixed being in a condition ready for use. The previously prepared metallic surface is now heated to a red heat (usually to from 1100 to 1500 degrees Fahrenheit). The described mixture is now sifted on to a metallic surface while the latter is in the heated condition described, and after the sifting operation is completed the article is put back into the furnace and fused for a few minutes or until the enamel portion of the mixture is fused and readily adheres to the particles of unfused silicate or glass and oxid to form a smooth surface. The article is then removed and allowed to cool, thus completing the process. If one coating of the sifted composition does not produce the desired uniform coating over the article the operation of sifting and fusing can be repeated until the desired uniformity is obtained.

As before stated, while I do not confine myself to the use of glass mixed with a suitable coloring oxid, but consider any mixture which will not fuse at the same temperature as ordinary enamel and a suitable coloring matter, to be within the spirit and scope of my invention, yet I have found by experience that glass and metallic oxid produce the most desirable results. In the use of non-colored glass, the metallic oxid of course alone produces the coloring. Colored glass, however, is originally colored by the use of metallic oxid, and hence in the use of colored glass in carrying out my invention a less quantity of the metallic oxid is required to be mixed with the glass in order to secure the desired degree of coloring effect. Therefore, any color of glass, as for instance blue glass, red glass, brown glass, etc., may be used to good advantage in carrying out the steps of my process, and the production of the composition.

What I claim as my invention is:

A mixture or composition for coating surfaces to produce a speckled or mottled appearance, said composition consisting of colored glass reduced to a fine or comminuted condition, and ordinary enamel.

In testimony whereof, I affix my signature, in presence of two witnesses.

CARL A. W. VOLLRATH.

Witnesses:
A. L. MORSELL,
ANNA F. SCHMIDTBAUER.